Dec. 26, 1961  J. H. MEYER ETAL  3,014,664
THERMOSTATIC SNAP-ACTION VALVE DEVICE
Filed Dec. 12, 1957  2 Sheets-Sheet 1
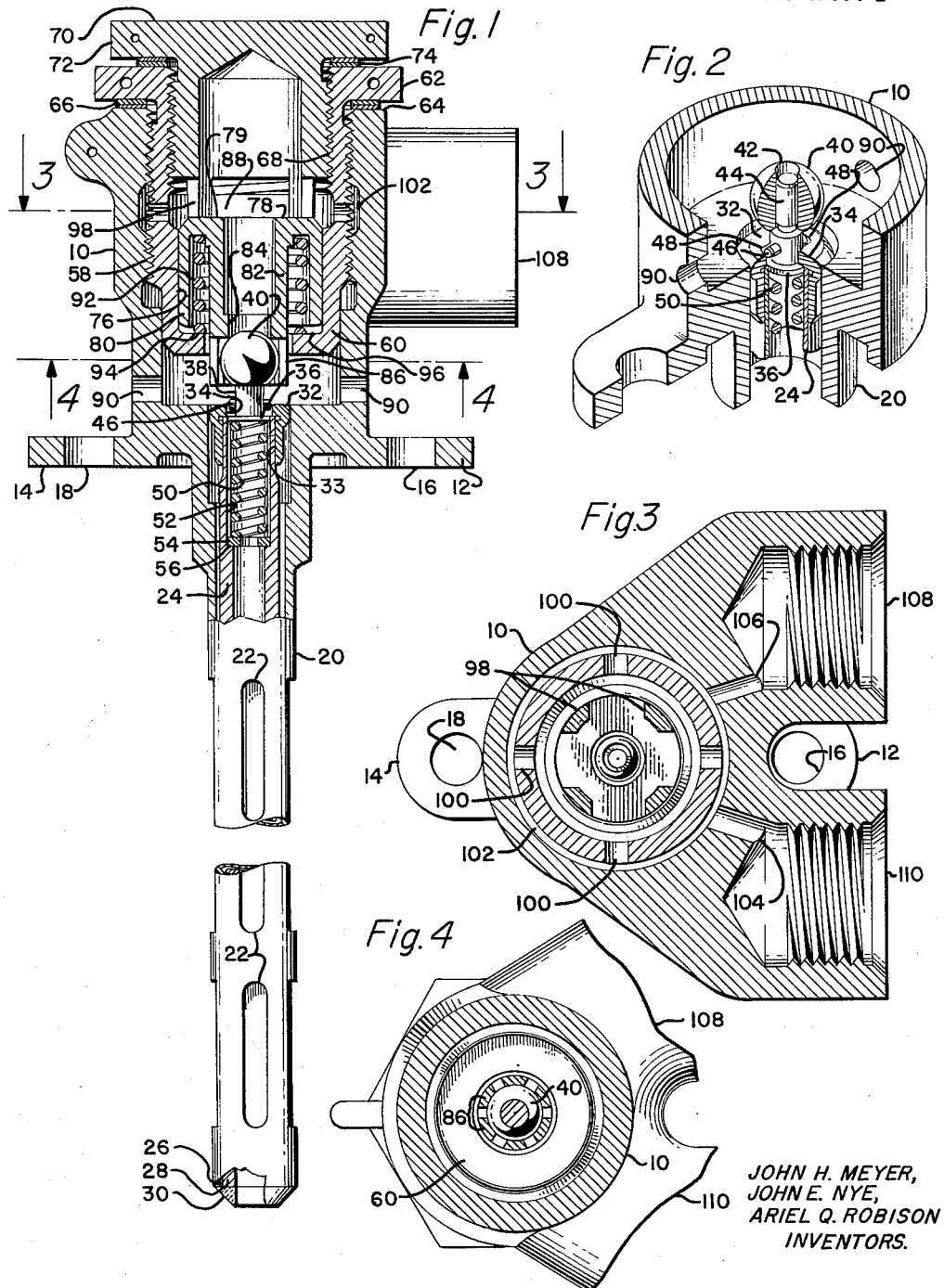
JOHN H. MEYER,
JOHN E. NYE,
ARIEL Q. ROBISON
INVENTORS.
BY
Herschel C. Omohundro
Attorney.

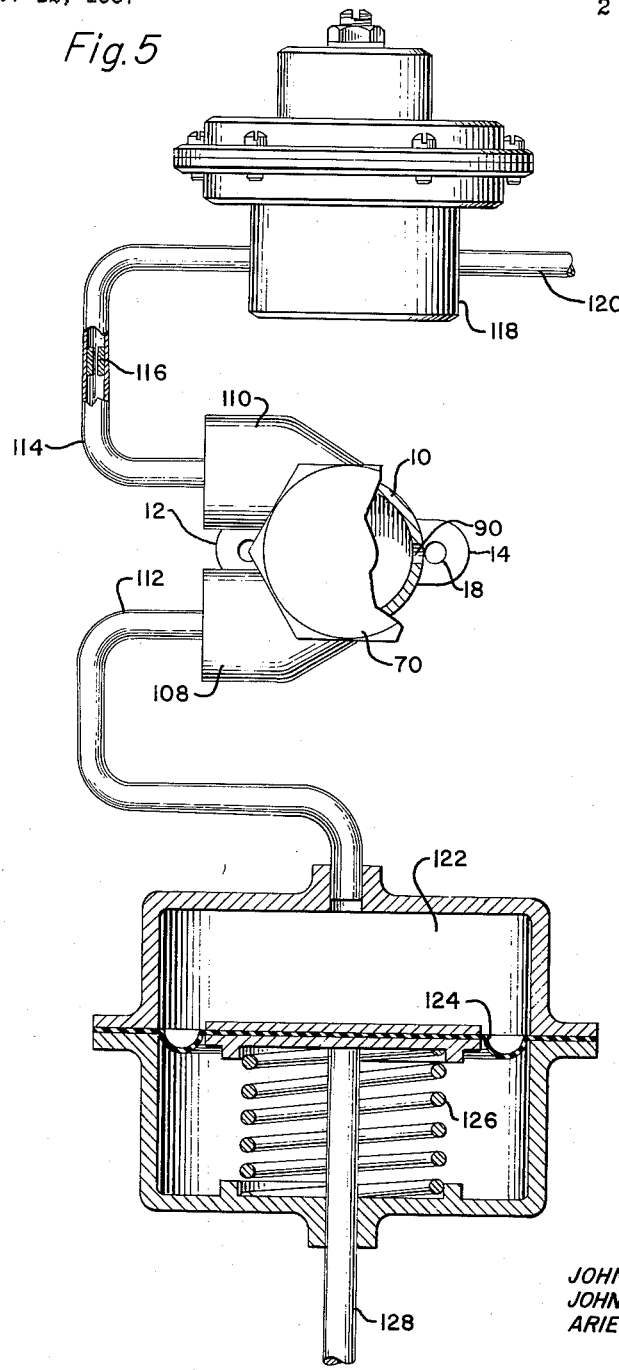

United States Patent Office 3,014,664
Patented Dec. 26, 1961

3,014,664
THERMOSTATIC SNAP-ACTION VALVE DEVICE
John H. Meyer, John E. Nye, and Ariel Q. Robison, Phoenix, Ariz., assignors to The Garrett Corporation, Los Angeles, Calif., a corporation of California
Filed Dec. 12, 1957, Ser. No. 702,474
1 Claim. (Cl. 236—81)

The present invention relates to a thermostatic snap-action valve device, and more particularly to a thermostatic snap-action valve which snaps open or closed at a predetermined temperature.

Thermostatic snap-action valves are generally employed to initiate or interrupt the volume flow of fluids in response to a predetermined temperature. Such valves when used in aircraft accessories must be very reliable, compact, and lightweight devices.

Accordingly, it is an object of the invention to provide a snap-action device having a minimum of parts, which will operate reliably and efficiently in response to the movement of one part thereof to effect snap action of a fluid control valve.

Another object is to provide a very lightweight and compact thermostatically operated snap-action fluid control valve which is particularly adapted for use in aircraft.

Another object of the invention is to provide a snap-action device which is not adversely affected by high temperature conditions.

Another object is to provide a thermostatic snap-action valve device which quickly responds to a predetermined temperature and causes an abrupt change in the flow and/or pressure of a control fluid.

Other objects and advantages of the invention may be apparent from the following specification, appended claim, and accompanying drawings, in which:

FIGURE 1 is a longitudinal sectional view of a thermostatic snap-action valve device constructed in accordance with the present invention, showing parts thereof in elevation to facilitate the illustration;

FIG. 2 is a fragmentary perspective view of a valve element and related mechanism of the present thermostatic snap-action valve device, showing portions thereof broken away and in section to amplify the illustration;

FIG. 3 is a transverse sectional view taken on a plane indicated by the line 3—3 of FIG. 1;

FIG. 4 is a transverse sectional view taken on a plane indicated by the line 4—4 of FIG. 1, showing the inlet and outlet conduits of the device fragmentarily; and FIG. 5 is an end view of the thermostatic snap-action valve device of the present invention, shown in connection with a conventional pressure regulator and a fluid pressure responsive actuator to illustrate a functional application of the present invention.

As shown in FIG. 1 of the drawings, the thermostatic snap-action valve device of the present invention is provided with a hollow cylindrical housing 10 having mounting flanges 12 and 14 provided with bolt-receiving openings 16 and 18 extending therethrough. Projecting from the housing 10 is a temperature-responsive tubular element 20 having a high coefficient of thermal expansion. This hollow tubular element 20 is provided with openings 22 in the side wall thereof which permit hot gases to enter the tubular element 20 and conduct heat to the inside, as well as the outside, thereof, as will be hereinafter described in detail.

Positioned internally of the tube 20 is a second hollow or tubular thermostatic element 24 which has a coefficient of thermal expansion relatively lower than that of the tube 20. Ends 26 and 28 of the tubes 20 and 24, respectively, are fixed together by a weld 30. The opposite end of the tube 24 is surrounded by a collar 32 which is fixed thereon by any suitable process, such as brazing or the like.

This collar 32 is provided with a bore 33 and an inwardly directed flange forming a shoulder 34 at one end thereof, as shown best in FIG. 2 of the drawings. The shoulder 34 is engaged by a flange 36 of a shaft 38, the flange 36 being slidably fitted in the bore 33. A valve element 40 is provided with a bore 42 which receives a reduced-diameter shank portion 44 on the shaft 38.

A pin 46 extends through the shaft 38 and projects therefrom in opposite directions. Projecting ends of the pin 46 are disposed in slots 48 formed in the flange at the end of the collar 32. These slots extend radially from the bore 33 and the shaft 38. The pin 46 is disposed to prevent rotation of the valve element 40 with respect to the tube 24 and housing 10.

A spring 50 is disposed in an enlarged bore portion 52 of the tube 24, and one end of the spring is supported on a washer 54 which engages a shoulder 56 at the end of the enlarged bore 52. The other end of the spring 50 engages the flange 36 at one end of the shaft 38, whereby force of the spring tends to maintain the flange 36 firmly engaged with the shoulder 34 of the collar 32.

The housing 10 is provided with an internally threaded bore 58 in which a sleeve 60 is threadedly supported. The sleeve 60 is provided with a flange 62 adjacent an end 64 of the housing 10, and shims 66 are disposed between the flange 62 and the end 64 of the housing. These shims are used to calibrate the present thermostatic snap-action valve device to operate at a predetermined temperature, as will be hereinafter described in detail.

The sleeve 60 is provided with an internally threaded bore 68 in which a cap 70 is threadedly supported. The cap 70 has a flange 72 adjacent the flange 62 of the sleeve 60. Between these flanges are shims 74 which determine a stop position of a valve element of the present thermostatic snap-action valve device, as will be hereinafter described in detail.

The sleeve 60 is provided with a smooth bore portion 76 which is slightly smaller in diameter than the threaded bore 68 and slidably receives a movable piston member 78. The piston 78 is provided with a hollow cylindrical skirt 80, integral with which is a concentric hollow cylindrical portion 82 having an annular shoulder 84 therein. This annular shoulder functions as a poppet valve seat and is engageable with the spherical valve element 40.

Integral with the hollow cylindrical portion 82 and extending beyond the shoulder 84 are spaced fingers 86 which are arranged in an annular row concentric with the shoulder 84 to guide the spherical valve element 40 and make it seat accurately to form an efficient valve. Spacing of the fingers 86 surrounding the spherical valve element 40 permits fluid to flow freely when the element is disengaged from the seat, from a chamber 88 to the ambient atmosphere via vent openings 90, as will be hereinafter described in detail.

A spring 92 engages the movable piston member 78 between the hollow cylindrical portions 80 and 82. One end 94 of this spring is supported on a ledge 96 of the sleeve 60, and the force of the spring tends to move the piston 78 toward the chamber 88 in opposition to fluid pressure therein.

Extending inwardly from the cap 70 are stop fingers 98 which limit movement of the piston 78 in a response to the force of the spring 92. The ledge 96 forms a stop for the piston 78 when it responds to fluid pressure in the chamber 88, which overcomes force of the spring 92. The space between the ledge 96 and the stops 98 is only a few thousandths of an inch greater than the length of the skirt 80 of the piston, whereby the valve seat element 84 is readily cooperable with the spherical valve element 40 within a range of movement caused by differential thermal expansion of the tubes 20 and 24.

As shown in FIGS. 1 and 3 of the drawings, the sleeve 60 is provided with openings 100 communicating with an annulus 102 between the sleeve 60 and the internal wall of the housing 10. This annulus is provided by an enlarged portion of the bore 58, wherein the screw threads are relieved. Communicating with the annulus 102 are passages 104 and 106 communicating with internally threaded conduit portions 108 and 110, respectively. These threaded conduit portions are adapted to receive conventional plumbing fittings, not shown, for establishing communication between tubular conduits and the passages 104 and 106.

As shown in FIG. 5 of the drawings, the conduit portions 108 and 110 communicate with tubular conduitis 112 and 114, respectively. A restricted passage 116 in the conduit 114 conducts regulated pressure fluid from a fluid pressure regulator 118, which receives pressure fluid from a suitable source through a supply tube 120. The tubular conduit 112 communicates with a pressure fluid chamber 122 at one side of an actuator diaphragm 124. Engaging the opposite side of the diaphragm 124 is a spring 126 which exerts force on the diaphragm 124 in a direction to oppose fluid pressure in the chamber 122. Connected to the diaphragm 124 is an actuator rod 128 which may be connected to a valve, or any other device as desired.

The thermostatic snap-action valve device of the present invention operates substantially as follows:

When, for example, the device of the present invention is disposed to sense the temperature of gas at the inlet or outlet of a gas turbine, the flanges 12 and 14 are bolted to a side wall structure of the gas turbine to support the tubes 20 and 24 so that they project into the gas stream passing through the turbine.

Before operation of the turbine is initiated and when the tubular elements 20 and 24 are at normal ambient temperatures, and when ambient pressure exists in the chamber 88, the piston 78 is held against the stop fingers 98 by force of the spring 92. At normal ambient temperatures, the tube 20 is fully contracted, and due to the high coefficient of expansion of the tube 20, the tube 24 is positioned so that the spherical valve element 40 is disposed in contact with or very close to the seat 84. It will be understood that ambient pressure may exist in the chamber 88 due to leakage of fluid pressure therefrom when there is no supply of pressure fluid passing through the restricted passage 116, shown in FIG. 5 of the drawings. This condition will exist when the control system associated with the present thermostatic snap-action valve device is not being operated.

When pressure fluid is admitted to the pressure regulator 118 and passes through the restricted passage 116 into the annulus 102 via the conduit 110 and passage 104, this pressure fluid is also conducted directly to the chamber 122 and diaphragm 124 via the passage 106 and conduits 108 and 112. Concurrently, pressure fluid passes through the openings 100 and into the chamber 88. This pressure fluid acts upon the end 79 of the piston 78. While the spherical valve element 40 is closely disposed relative to the seat 84, pressure fluid builds up in the chamber 88 and forces the piston 78 against compression of the spring 92 into engagement with the ledge 96. When the piston 78 moves into engagement with the ledge 96, the seat 84 engages the spherical valve element 40 and forces the flange 36 and shaft 38 axially of the tube 24, causing slight compression of the spring 50. In this position, the spherical valve element 40 is very tightly engaged with the seat 84, and thereby maintains pressure fluid in the chamber 88 and chamber 122 communicating therewith.

Fluid pressure in the chamber 122 acting on the diaphragm 124 against force of the spring 126 maintains the actuator rod 128 in a predetermined position as long as fluid temperature surrounding the tube 20 is maintained below a predetermined value. The actuator rod 128 may be used to hold a fuel valve open or may be used to control the position of any other device, as desired.

When the temperature of fluid surrounding the tube 20 rises and approaches a predetermined value, it causes considerable longitudinal expansion of the tubular member 20 and a relatively lesser expansion of the tubular member 24, thereby causing a movement of the spherical valve element 40 in a direction to disengage it from the seat 84. Initially, a slight leakage of fluid from the chamber 88 through the seat 84 causes a slight reduction of fluid pressure in the chambers 88 and 122. When the temperature of fluid surrounding the tube 20 actually reaches the predetermined value at which the thermostatic valve device operates in a snap-action fashion, there is sufficient fluid leakage through the seat 84 around the spherical valve element 40 to cause a substantial reduction of pressure in the chamber 88, at which time force of the spring 92 overcomes force of fluid pressure in the chamber 88, whereupon the piston 78 snaps to a position in engagement with the stop fingers 98.

The valve seat 84 is then fully open, permitting pressure fluid to be bled from the chamber 88 between the fingers 86 and to atmosphere via the openings 90. When pressure fluid is thus rapidly reduced in the chamber 88 downstream of the restricted passage 116, fluid pressure in the chamber 122 is likewise reduced, and the spring 126 moves the actuator diaphragm 124 and rod 128 toward the chamber 122. It will be seen that the actuator rod 128 may at this time close a fuel valve or operate a safety device in connection with a gas turbine control system as a result of an overtemperature condition sensed by the tubular elements 20 and 24.

As hereinbefore pointed out, the shims 66 and 74 are placed in the mechanism of the present thermostatic snap-action valve device during assembly thereof in order to calibrate the positions at which the valve elements 40 and 84 operate with relation to predetermined temperatures, so that the piston 78 will snap from a position adjacent the ledge 96 and into engagement with the fingers 98 when the tubular element 20 is subjected to a predetermined temperature. Furthermore, the stop fingers 98 hold the seat 84 in proper position with respect to the valve element 40 when the tube 20 is subjected to ambient temperatures, as hereinbefore described. From the foregoing, it will be seen that the stop fingers 98 are so spaced from the ledge 96 that movement or travel of the piston 78 therebetween is limited to a distance which substantially corresponds with the distance represented by differential movement of the thermostatic elements 20 and 24 when subjected to temperatures which vary from ambient atmospheric temperatures to predetermined higher temperatures.

The device of the present invention is applicable to various equipment requiring snap action in response to a predetermined temperature to cause an abrupt change in the flow and/or pressure of a control fluid. Various embodiments of the present device may be included in numerous devices, including gas turbine fuel systems, combustion engine starter systems, and various other equipment such as that used in aircraft.

It will be obvious to those skilled in the art that various modifications of the present invention may be resorted to in a manner limited only by a just interpretation of the following claim.

We claim:

In a thermally responsive control device, the combination comprising: a housing forming a chamber with a plurality of ports communicating therewith, one of said ports constituting an inlet, another port constituting an outlet and a third port constituting an exhaust; means establishing limited communication between said inlet and a source of fluid pressure; means establishing communication between said outlet and the pressure chamber of an actuator; a combination piston guide and stop means disposed for adjustment in said housing, said piston guide forming a chamber communicating with said ports; piston means disposed for movement in said guide means, said piston means forming a passage establishing communication between the chamber in the piston guide means and the outlet port in said housing, said piston also forming a valve seat between such chamber and said outlet port; a cap for said piston guide and stop means, said cap forming a second stop means for said piston; resilient means tending to move said piston means toward said second stop means, fluid pressure in the chamber in said piston guide tending to move said piston means toward said first-mentioned stop means; thermostat means having a pair of telescoped elongated members with different coefficients of expansion, said thermostat means registering with and extending axially away from the passage and valve seat in said piston, the ends of said members remote from said seat being joined to one another, the opposite end of the member with the highest coefficient of expansion being connected with said housing; a valve element resiliently carried by the end of the member with the lower coefficient of expansion adjacent said valve seat, said valve element engaging said seat when said thermostat means is below a predetermined temperature, elongation of the member having the higher coefficient of expansion serving to move said valve away from said seat and permit said resilient means to move said piston means to quickly increase the space between said valve and seat to vent said housing chamber and relieve the pressure in the port communicating with the pressure chamber of an actuator.

References Cited in the file of this patent

UNITED STATES PATENTS

| | | |
|---|---|---|
| 1,312,253 | Johnson | Aug. 5, 1919 |
| 1,363,470 | Knudsen | Dec. 28, 1920 |
| 1,741,892 | Volkman | Dec. 31, 1929 |
| 2,107,673 | Lovekin | Feb. 8, 1938 |
| 2,749,047 | Dotson | June 5, 1956 |
| 2,843,325 | Greenwald | July 15, 1958 |